United States Patent [19]

Ohtsubo

[11] Patent Number: 4,643,942
[45] Date of Patent: Feb. 17, 1987

[54] PERPENDICULAR MAGNETIC RECORDING MEDIUM

[75] Inventor: Akio Ohtsubo, Miyagi, Japan

[73] Assignee: Bayer Aktiengesellschaft, Leverkusen, Fed. Rep. of Germany

[21] Appl. No.: 689,758

[22] Filed: Jan. 9, 1985

[30] Foreign Application Priority Data

Jan. 14, 1984 [JP] Japan ................................. 59-5201
Nov. 6, 1984 [JP] Japan ............................. 59-232289

[51] Int. Cl.⁴ ............................................. G11B 5/70
[52] U.S. Cl. .................................. 428/328; 428/694; 428/900; 427/131
[58] Field of Search ...................... 428/900, 694, 328; 427/128, 131, 132; 252/62.56

[56] References Cited

U.S. PATENT DOCUMENTS

| | | | |
|---|---|---|---|
| 3,228,881 | 1/1966 | Thomas | 523/205 X |
| 4,442,159 | 4/1984 | Dezawa et al. | 428/900 X |
| 4,451,535 | 5/1984 | Pingaud et al. | 428/900 X |
| 4,511,617 | 4/1985 | Hideyama et al. | 428/900 X |

Primary Examiner—Nancy Swisher
Attorney, Agent, or Firm—Sprung Horn Kramer & Woods

[57] ABSTRACT

This invention relates to a two-layer coated recording medium for perpendicular magnetic recording, said medium being composed of
(a) a coated non-oriented perpendicular recording layer containing single-domain particles having multiaxial crystalline anisotropy, and
(b) a high permeability layer, with the proviso that the case where the layers (a) and (b) both contain magnetic particles prepared by decomposition of metal carbonyls is excluded.

9 Claims, 2 Drawing Figures

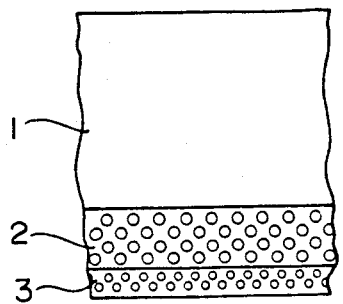
FIG. 1
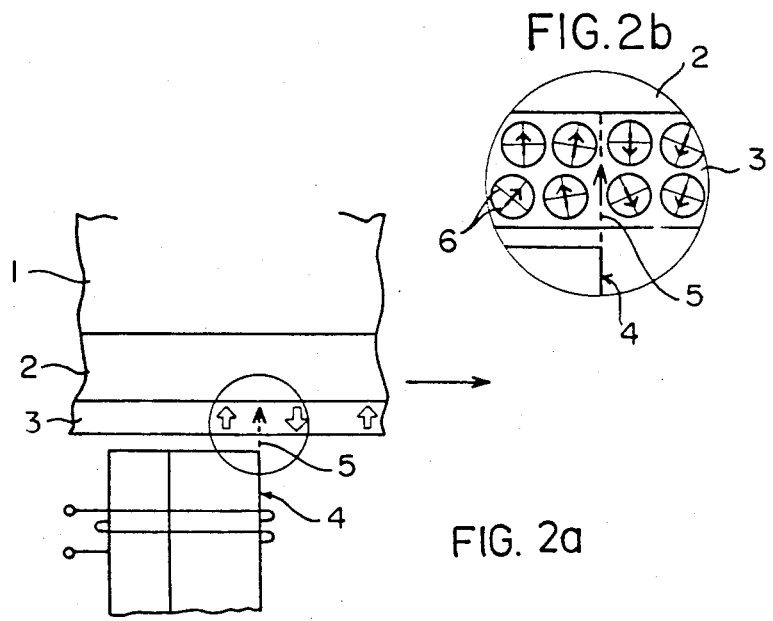
FIG. 2b
FIG. 2a

PERPENDICULAR MAGNETIC RECORDING MEDIUM

This invention relates to a perpendicular magnetic recording medium, and more specifically to a two-layer recording material for perpendicular magnetic recording.

The perpendicular magnetic recording method by which the surface of a medium is magnetized in its perpendicular direction has recently been actively studied because it can achieve high-density-magnetic-recording as compared with the conventional horizontal magnetic recording method in which the surface of a medium is magnetized in its longitudinal direction. This method has already been realized with a CoCr-NiFe two-layer vapor deposited medium. However, when such a medium is used as a sound recording tape, its hard vapor-deposited film makes it difficult for the tape to touch the head, and its practical application is difficult.

The inventor of this application made extensive investigations on a perpendicular magnetic recording medium which has good liability and lends itself to mass production. He previously proposed a two-layer coated perpendicular magnetic recording medium comprising a coated perpendicularly oriented perpendicular recording layer containing spherical single-domain particles having crystalline magnetic anisotropy or single-domain fine particles having magnetic shape anisotropy with an aspect ratio of from 3 to 1.3 and a layer of fine soft magnetic particles of a multi-domain size (high permeability layer) having a saturation flux density equal to, or higher than, the coated perpendicular recording layer (Japanese Laid-Open Patent Publication No. 283629/1982). Since, however, the single-domain particles in the perpendicular recording layer of this medium are particles having uniaxial anisotropy (for example, hexagonal cobalt metal particles), the recording layer must be subjected to a perpendicular magnetic field orientation treatment in order to increase the perpendicular squareness ratio of the recording layer. In practice, it is considerably difficult to perform this treatment without impairing the smoothness of the surface of the medium.

Lemke reported that they succeeded in performing high density recording by a quasi-perpendicular recording technique with a combination of an isotropic single coated layer medium and a narrow gap ring head /-see J. Appl. Phys., 53 (1982), 2561/. The particles of this medium are obtained by doping "rice-like" gamma-$Fe_2O_3$ particles having reduced shape anisotropy with Co to impart multiaxial crystalline magnetic anisotropy to these particles. Thus, even in the non-oriented state, these particles can show a high squareness ratio as well in the plane as in the perpendicular direction. However, its high recording density is obtained only in the case of using a very small accurate recording critical magnetic field zone, and only the recording residual magnetization on the very surface of the medium is utilized.

It is an object of this invention to provide an improved perpendicular magnetic recording medium which offers a solution to the aforesaid problems of the conventional perpendicular recording medium.

According to this invention, this object is achieved by a two-layer coated recording medium for perpendicular magnetic recording, said medium being composed of (a) a coated non-oriented (namely, isotropic) perpendicular recording layer containing single-domain particles having multiaxial crystalline anisotroipy, and (b) a high-permeability layer, with the proviso that the case where the layers (a) and (b) both contain magnetic particles prepared by decomposition of metal carbonyls is excluded.

The two-layer coated recording medium of this invention for perpendicular magnetic recording has various excellent advantages including the following:

(i) it has good liability and excellent magnetic head to-tape contact, (ii) in can be produced on a mass production scale;

(iii) in combination with a single pole head, a recording magnetic field which is deep and strong in the perpendicular direction of the medium and has a sharp-cut field distribution in the running direction of the medium can be produced in the recording layer; and (iv) it has a high squareness ratio, and since it is non-oriented, it has excellent surface smoothness.

As shown in FIG. 1, the two-layer recording medium of this invention is prepared by first coating a high permeability layer (2) composed of soft magnetic particles to a thickness of 1 to 5 microns on a flexible plastic film substrate (1), and on top of the layer (2), coating a perpendicular recording layer (3) composed of hard magnetic particles having a plurality of anisotropic easy axes (multiaxial crystalline anisotropy) having almost equal magnitudes, to a thickness of 0.3 to 1.5 microns in the non-orientated state.

The thickness of the individual layers can be properly determined by considering the following conditions. The thickness of the high permeability layer should preferably be larger to obtain good conditions for the sinking of the magnetic flux from the single pole head (i.e. good recording efficiency) and to form a horseshoe mode at long wavelengths (i.e. good reproducing efficiency), but excessively large thicknesses are not good with regard to noises. With regard to the thickness of the perpendicular recording coated layer (3), it is coated preferably as thin as the coating technology permits since the parameter which determines recording efficiency with a combination of a single pole head and a double layer medius is $$\mu(HPL) \times Tm/(d_R+S)$$

where $\mu(HPL)$ is the permeability of the high permeability layer (2), Tm is the thickness of the single pole head, $d_R$ is the thickness of the recording layer, and S is the spacing between the head and the surface of the medium.

Even so, the thickness of the recording layer cannot be made as thin as the thickness (about 0.2 micron) of the known CoCr-NiFe vapor deposited film. Thus, the recording efficiency of the two-layer recording medium of this invention may be increased by using the "thick non-parallel single pole head" previously developed by the present inventor (Japanese Laid-Open Patent Publications Nos. 133510/1982 and 19715/1983 and PCT Application No. PCT/JP 82/00035) as the single pole head to be combined, whereby the average head thickness $\overline{Tm}$ is increased and the above parameter value is increased. The above non-parallel single pole head is to resolve the contradiction between resolution in reproduction and recording and reproduction efficiencies with respect to Tm in an ordinary parallel recording and playback single pole head by arranging the trailing edge and the leading edge of the single pole head in a non-parallel relationship and thus producing the azimuth effect.

Now, the magnetism of the particles in each layer will be described.

The magnetic particles to be included in the coated isotropic perpendicular recording layer (3) are singledomain particles which satisfy the following two conditions. (i) They should have magnetic anisotropy sufficient to give a moderate coercivity $H_c$, generally 200 to 1,500 oersteds, preferably 600 to 800 oersteds. (ii) They should have a high squareness ratio even in the non-oriented state. For this purpose, these particles should have multiaxial crystalline anisotropy with a pluraility of magnetically anisotropic easy axes having equivalent magnitudes.

Substances which satisfy the conditions (i) and (ii) may, for example, be multiaxial crystalline anisotropy magnetic particles having nearly equal crystalline magnetic anisotropy of a suitable magnitude in a plurality of easy axes, for example Co-doped gamma-$Fe_2O_3$. Desirably, such particles are rendered spherical, cubic or rice-shaped in order to make their shape magnetic anisotropy zero or small. Preferably, these particles are dispersed as discrete particles in the binder of the recording coated layer.

The perpendicular recording layer (3) can be formed by uniformly dispersing the aforesaid magnetic particles in a solution of a binder resin, and coating the dispersion on the high permeability layer to be described.

The magnetic particles to be incorporated into the high permeability layer (2) are soft magnetic particles having a size of not more than 2,000Å with respect to the reduction of noise of the recording medium and at least 100Å with respect to their dispersibility. They have a particle size according to the required purpose and preferably as narrow a particle size distribution as possible. When these particles are of the singledomain size, their magnetization occurs in accordance with a rotating mechanism. Particles with the multidomain size at high frequencies also undergo magnetization mainly by a rotating mechanism because the movement of the magnetic wall becomes more difficult to move. In order to increase the permeability of the layer (2), therefore, it is necessary to select particles of a shape having small shape anisotropy, namely monodisperse spherical particles rather than acicular particles as the magnetic particles to be incorporated into the layer (2), and a magnetic material having small crystalline magnetic anisotropy for such particles, so that magnetization rotation becomes easy.

The high-permeability layer (2) can be formed by coating a resin binder solution containing the above soft magnetic particles dispersed therein on a substrate film as in the preparation of the perpendicular recording layer (3).

As the magnetic particles for forming the high-permeability layer, there can be used, for example, gamma-$Fe_2O_3$ or $Fe_3O_4$ particles not doped with Co, monodisperse spherical single-crystal metallic iron particles prepared by the thermal decomposition of an iron carbonyl compound in accordance with the method described in U.S. Pat. No. 3,228,881, and metallic iron particles produced by the reduction of a metal salt with hypophosphorous or the evaporation of a metal in a rare gas. Where higher permeability is required, Fe-Ni alloy (permalloy) particles may be used. It should be understood however that the case where both the perpendicular recording layer and the high permeability layer contain magnetic particles prepared by the decomposition of metal carbonyls is excluded from the present invention.

With respect to the magnetic relation of the perpendicular recording layer (3) and the high-permeability layer (2), it is necessary to make the saturation flux density Bs of the high permeability layer equal to or greater than the Bs of the perpendicular recording layer in order that the magnetic flux from the recording layer may be caused to sink sufficiently into the high permeability layer and thus perform recording magnetization efficiently to saturation point in the recording layer.

The recording medium of this invention can exhibit the following various excellent advantages attributed to the aforesaid novel construction.

Generally, in a combination of a single pole head and the double layer recording medium of this invention, a deep, strong sharp-cut perpendicular magnetic field acts on the recording layer by the induced magnetostatic interaction between the head and the high permeability layer. If this recording layer is formed, for example, of an isotropic coated film of Co-doped gamma-$Fe_2O_3$ particles, the individual particles are magnetized along the easy axes close to the perpendicular (magnetic field) direction as shown in FIG. 2. In this example, there are three perpendicularly crossing easy axes. Since one of the axes of the non-oriented particles is included within 45 degrees from the perpendicular direction, the particles show a high perpendicular squareness ratio (about 0.8). In other words, in this combination according to the present invention, the isotropic coated film acts as a good perpendicular recording layer, and records as good perpendicularly magnetized pattern. Hence, high resolution and high output can be obtained. Furthermore, this coated perpendicular recording layer in the recording medium of this invention has a smooth surface because it is a non-oriented coated film not subjected to a perpendicular magnetic orientation treatment which causes surface roughness. On the contrary, uniaxially anisotropic particles require the perpencidular orientation treatment. Because of this smoothness and the flexibility of the coated film itself, the coated recording layer is markedly characterized by having very good head-tomedia contact which is important in high density recording.

It can be said therefore that the recording medium of the present invention using an isotropic coated film in the coated two-layer perpendicular recording layer is a most practical perpendicular magnetic recording medium which has excellent resolution, output, head touch and productivity.

The following Examples specifically illustrate the method of preparing the recording medium of this invention.

EXAMPLE 1

(1) Magnetic particles for a perpendicular recording layer

Nearly cubic particles of gamme-$Fe_2O_3$ doped with Co to impart multiaxial crystalline magnetic anisotropy (coercivity Hc 600 to 850 oersteds), or rice-shaped particles of gamma-$Fe_2O_3$ doped with Co.

(2) Magnetic particles for a high permeability layer

Cubic particles of gamma-$Fe_2O_3$ not doped with Co.

The above particles are dispersed uniformly in a solution of polar group-containing resin binder (such as a blend of polyurethane and vinyl chloride/vinyl acetate copolymer) in an organic solvent (such as toluene, or methyl ethyl ketone). The resulting dispersions are successively coated on a plastic film substrate, and dried to give a double coated recording medium having a perpendicular magnetic recording layer containing Co-doped gamma-$Fe_2O_3$ particles and a high permeability layer containing gamma-$Fe_2O_3$ not doped with Co.

EXAMPLE 2

(1) Magnetic particles for a perpendicular recording layer (the same as in Example 1)

(2) Magnetic particles for a high permeability layer

Spherical metallic Fe particles (which can be prepared by thermally decomposing an iron carbonyl compound by the method described in the specification of U.S. Pat. No. 3,228,881; particle diameter about 500Å, coercivity Hc less than 35 oersteds).

Iron pentacarbonyl is dispersed in a solution of a polar-group-containing polymer in a hydrocarbon, and the dispersion is heated under reflux until the evolution of carbon monoxide ceases to decompose the iron pentacarbonyl and prepare a polymer solution containing spherical metallic Fe particles. The solution is mixed with the same binder solution as in Example 1, and the mixture is coated on a plastic film substrate and dried. Then, a polar group-containing resin binder solution containing the magnetic particles for the perpendicular recording layer dispersed therein is further coated and dried.

EXAMPLE 3

(1) Magnetic particles for a perpendicular recording layer: the same as in Example 1.

(2) Magnetic particles for a high permeability layer: Fe-Ni alloy (permalloy) particles By operating in the same way as in Example 1, there is obtained a two-layer coated recording medium having a perpendicular recording layer containing Co-doped gamma-$Fe_2O_3$ and a high permeability layer containing Fe-Ni alloy particles.

FIG. 1 is a rough view of the cut section of the recording medium of this invention, and FIG. 2 is a rough view of a recording mechanism.

In the drawings, 1... plastic film substrate, 2... high permeability layer, 3... perpendicular recording layer containing isotropic magnetic particles, 4... trailing edge of a thick non-parallel single pole head, 5... perpendicular recording magnetic field, 6... easy axis of crystalline magnetic anisotropy.

I claim:

1. A two-layer coated recording medium for perpendicular magnetic recording, said medium being composed of
    (a) a coated non-oriented perpendicular recording layer containing single-domain particles having multiaxial crystalline anisotropy, and
    (b) a high permeability layer containing soft magnetic particles having a particle size in the range of 100 to 2000Å with the proviso that the case where the layers (a) and (b) both contain magnetic particles prepared by decomposition of metal carbonyls is excluded.

2. The recording medium of claim 1 wherein the single-domain particles contained in the perpendicular recording layer have a coercivity of 200 to 1,500 oersteds.

3. The recording medium of claim 1 wherein the magnetic shape anisotropy of the single-domain particles contained in the perpendicular recording layer is zero or small.

4. The recording medium of claim 1 wherein the single-domain particles contained in the perpendicular recording layer are spherical, cubic or rice-shaped.

5. The recording medium of claim 1 wherein the single-domain particles contained in the perpendicular recording layer have multiaxial crystalline anisotropy.

6. The recording medium of claim 1 wherein the single-domain particles contained in the perpendicular recording layer are nearly cubic or rice-shaped particles of Co-doped gamma-$Fe_2O_3$.

7. The recording medium of claim 1 wherein the magnetic particles contained in the high permeability layer have small shape magnetic anisotropy and small crystalline magnetic anisotropy.

8. The recording medium of claim 1 wherein the saturation magnetic flux density (Bs) of the magnetic particles contained in the high permeability layer is larger than that of the single-domain particles contained in the perpendicular recording layer.

9. The recording medium of claim 1 wherein the magnetic particles contained in the high permeability layer are cubic particles of gamma-$Fe_2O_3$, spherical particles of Fe or spherical particles of Fe-Ni alloy.

* * * * *